United States Patent [19]
Recker et al.

[11] Patent Number: 5,198,971
[45] Date of Patent: Mar. 30, 1993

[54] SEPARATION CONTROL FOR MULTIPHASE PLURAL INVERTER SYSTEM

[76] Inventors: Bradley J. Recker, 5281 Pepper Dr., Rockford, Ill. 61111; Derrick Roe, 3385 Quiet Valley La., Rockford, Ill. 61109

[21] Appl. No.: 745,413

[22] Filed: Aug. 15, 1991

[51] Int. Cl.⁵ .................... H02M 1/08; H02M 1/12
[52] U.S. Cl. .......................... 363/71; 363/41; 363/98
[58] Field of Search ............ 363/41, 43, 64, 71, 363/97, 98

[56] References Cited

U.S. PATENT DOCUMENTS

| | | | |
|---|---|---|---|
| 3,205,424 | 9/1965 | Bates | 321/18 |
| 3,416,062 | 12/1968 | Bernhard et al. | 321/16 |
| 3,548,797 | 12/1970 | Hagihara | 123/136 |
| 3,671,846 | 6/1972 | Corey . | |
| 3,781,635 | 12/1973 | Sauer | 363/71 |
| 3,943,429 | 3/1976 | Heintze | 321/26 |
| 3,979,662 | 9/1976 | Klein | 321/27 MS |
| 4,032,832 | 6/1977 | Miller | 363/43 |
| 4,382,275 | 5/1983 | Glennon | 363/41 |
| 4,405,976 | 9/1983 | Mitchell et al. | 363/72 |
| 4,549,258 | 10/1985 | Honbu et al. | 363/71 |
| 4,802,079 | 1/1989 | Mizoguchi | 363/71 |
| 4,882,120 | 11/1989 | Roe et al. | 363/98 |

FOREIGN PATENT DOCUMENTS 915189  3/1982  U.S.S.R. .

Primary Examiner—Emanuel T. Voeltz
Attorney, Agent, or Firm—Marshall, O'Toole, Gerstein, Murray & Bicknell

[57] ABSTRACT

A system for receiving DC input and for providing AC output is disclosed having first and second inverters. The first inverter has an input for receiving DC input and an output for providing a first inverter output and the second inverter has an input for receiving DC input and an output for providing a second inverter output. An inverter controller is connected to the first and second inverters for controlling the first and second inverters such that the first and second inverter outputs are separated in phase by a predetermined number of degrees in order to suppress harmonics in the AC output. An output circuit is arranged to combine the first inverter output and the second inverter output into the AC output.

18 Claims, 5 Drawing Sheets

SEPARATION CONTROL FOR MULTIPHASE PLURAL INVERTER SYSTEM

BACKGROUND OF THE INVENTION

The present invention relates to phase separation control of multiphase plural inverter systems and, more particularly, to such controls wherein the phases of the second inverter output signals are offset from the phases of the first inverter output signals in order to further suppress unwanted harmonics.

Copending U.S. patent application Ser. No. 07/745,425, filed on Aug. 15, 1991 discloses an inverter control system wherein a first inverter is controlled by a difference in DC content between each phase of an output AC and neutral and a second inverter is controlled based upon the difference in DC content between corresponding first and second inverter output phases. Copending U.S. patent application Ser. No. 454,434 filed on Dec. 20, 1989, show that by controlling the phase relationship between first and second inverters, the magnitude of the output AC may be regulated. Furthermore, U.S. Pat. No. 4,875,149 discloses a system for separating the phases of an inverter. The present invention recognizes that further harmonics may be suppressed by controlling the output of a second inverter such that each output phase from the second inverter is offset from its corresponding phase produced by a first inverter.

Power inverters for converting DC power into AC power are typically of the polyphase type wherein a plurality N of AC phase outputs are produced. During operation of the inverter, an unbalanced load condition can arise wherein the loads on the phases are unequal. Typically, a polyphase filter is coupled to the inverter output which introduces phase shifts as a function of load. For such an inverter and filter, an unbalanced load condition can cause unequal phase shifts among the phases, resulting in phase errors. These phase shifts are undesirable inasmuch as most polyphase loads require polyphase power at precise angular displacements.

Such phase shifts are even more objectionable where the inverter is a part of a variable speed, constant frequency (VSCF) generating system which is connected in parallel with another VSCF system to one or more loads. In this case, the displacement between corresponding parallel-connected phases of the VSCF system determines the real load power share therebetween. If the displacements of the output phases of both systems are not controlled precisely, a highly undesirable load share condition may arise, in turn resulting in damage or destruction of one or more components.

Moreover, as discussed in our copending patent application Ser. No. 07/745,425, filed on Aug. 15, 1990, advantages can be obtained from using plural inverters in order to share power supplied to the loads. That copending application shows a way in which the first and second controllers can be controlled in order to minimize DC content. The present invention can be used in addition to or as an alternative to the second control disclosed in copending patent application Ser. No. 07/745,425, filed on Aug. 15, 1991. In the present invention, the outputs of the second inverter are phase shifted from the outputs of the first inverter in order to reduce harmonics in the power supplied to the loads.

SUMMARY OF THE INVENTION

Accordingly, the present invention is directed to a system for receiving DC input and for providing AC output wherein the AC output has at least two phases. The system includes a first inverter having an input for receiving DC input and an output for providing a first inverter output having at least first and second phases. The system includes a second inverter having an input for receiving DC input and an output for providing a second inverter output also having at least first and second phases. An inverter controller is connected to the first and second inverters and controls the first inverter such that its first and second phases are separated by a first number of degrees. The inverter controller also controls the second inverter such that its first and second phases are separated from each other by a second number of degrees and are separated from the first and second phases of the first inverter by a third number of degrees. An output circuit is connected to the first inverter and to the second inverter for combining the first inverter output first phase and the second inverter output first phase into a first phase of an AC output and for combining the first inverter output second phase and the second inverter output second phase into a second phase of the AC output.

BRIEF DESCRIPTION OF THE DRAWINGS

These and other features and advantages will become more apparent from a detailed consideration of the invention when taken in conjunction with the drawings in which:

FIG. 5 illustrates still another embodiment.

DETAILED DESCRIPTION

Figure 1:
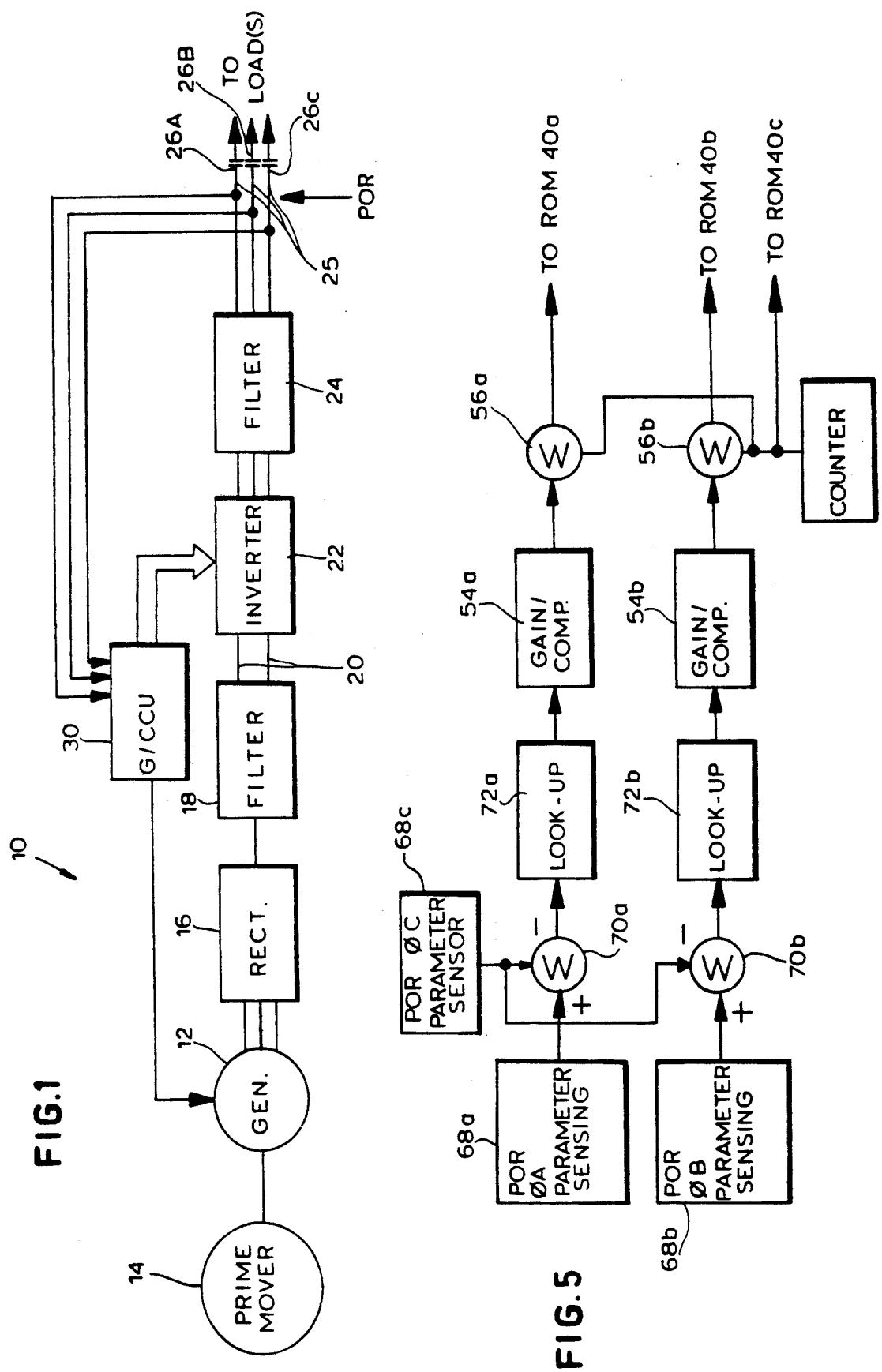
FIG. 1 is a block diagram of a variable speed constant frequency (VSCF) system incorporating the present invention.

As shown in FIG. 1, VSCF system 10 includes brushless, synchronous generator 12 which is driven by variable speed prime mover 14 which may be, for example, a jet engine. Generator 12 develops output power at a frequency which is variable in dependence upon the speed of prime mover 14. The variable frequency power developed by generator 12 is converted into DC power by rectifier 16 and filter 18, and is delivered over DC link 20 to the polyphase inverter 22 which may be coupled to optional output filter 24. Filter 24 is connected to feeder 25 and contactors 26A-26C to one or more loads. Inverter 22 includes inverter switches, shown in greater detail in FIG. 2, which are controlled by generator/converter control unit (G/CCU) 30 which incorporates phase separation control. The G/CCU also controls the excitation of generator 12 in accordance with one or more parameters of the power developed at a point of regulation (POR) near contactors 26A-26C.

Figure 2:
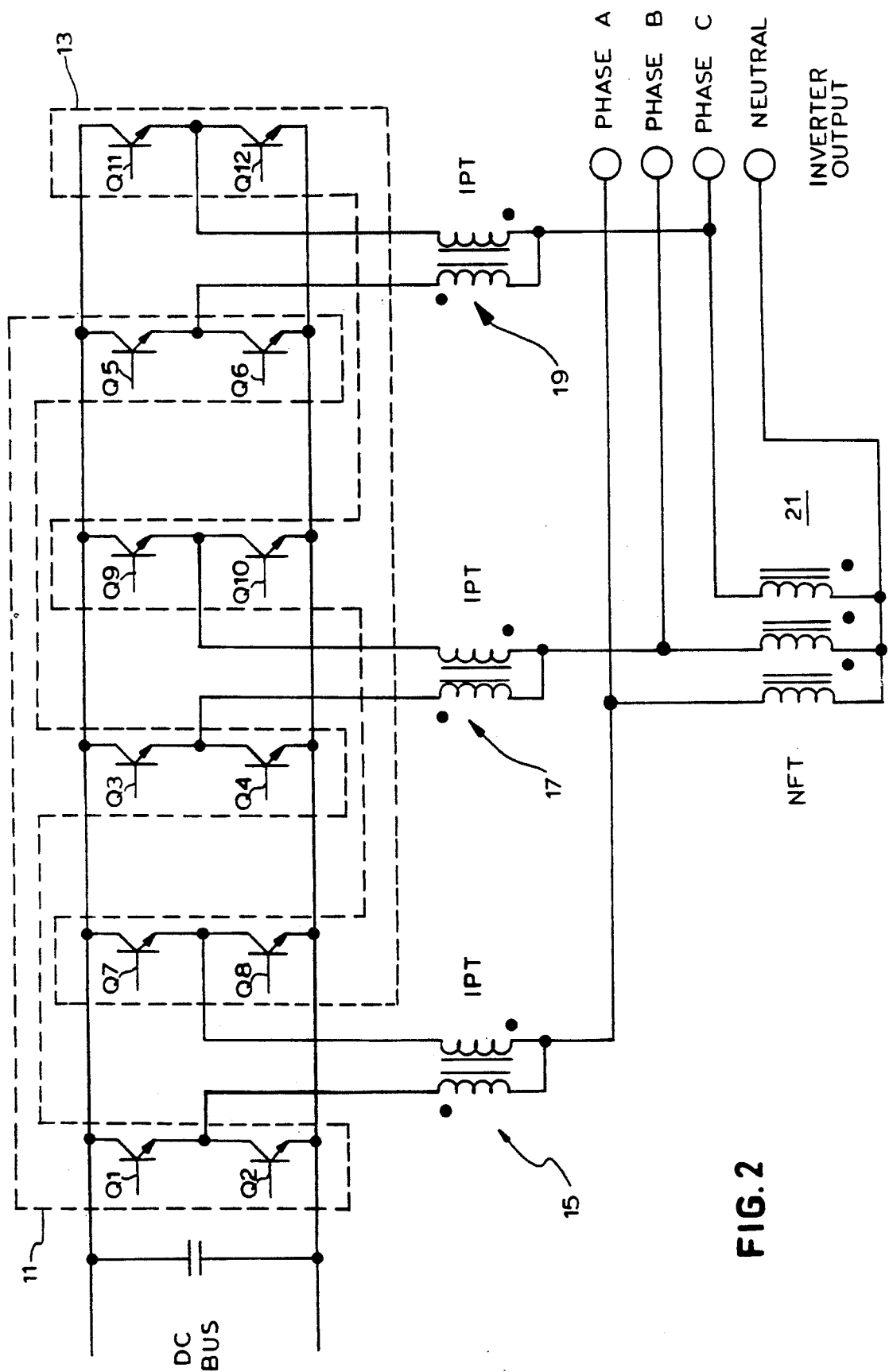
FIG. 2 shows the inverter of FIG. 1 in more detail.

As shown in FIG. 2, inverter 22 is comprised of first inverter 11 and second inverter 13. Transistors Q1 and Q2 of first inverter 11 are connected in series across the DC bus for providing a first phase of the first inverter output to interphase transformer (IPT) 15. Transistors Q3 and Q4 of first inverter are also connected in series across the DC bus for providing a second phase of the first inverter output to IPT 17. Transistors Q5 and Q6 of first inverter 11 are connected in series across the DC bus for providing a third phase of the first inverter output to IPT 19.

Transistors Q7 and Q8 of second inverter 13 are connected in series across the DC bus for providing a first phase of the second inverter output to IPT 15. Transistors Q9 and Q10 of second inverter 13 are connected in series across the DC bus for providing a second phase of the second inverter output to IPT 17. Transistors Q11 and Q12 of second inverter 13 are connected in series across the DC bus for providing a third phase of the second inverter output to IPT 19. IPTs 15, 17, and 19 provide corresponding phase A, phase B, and phase C outputs for consumption by loads. In addition, the output of each transformer is connected to neutral-forming transformer (NFT) 21 which is arranged for providing a neutral phase to the loads.

Figure 3A:
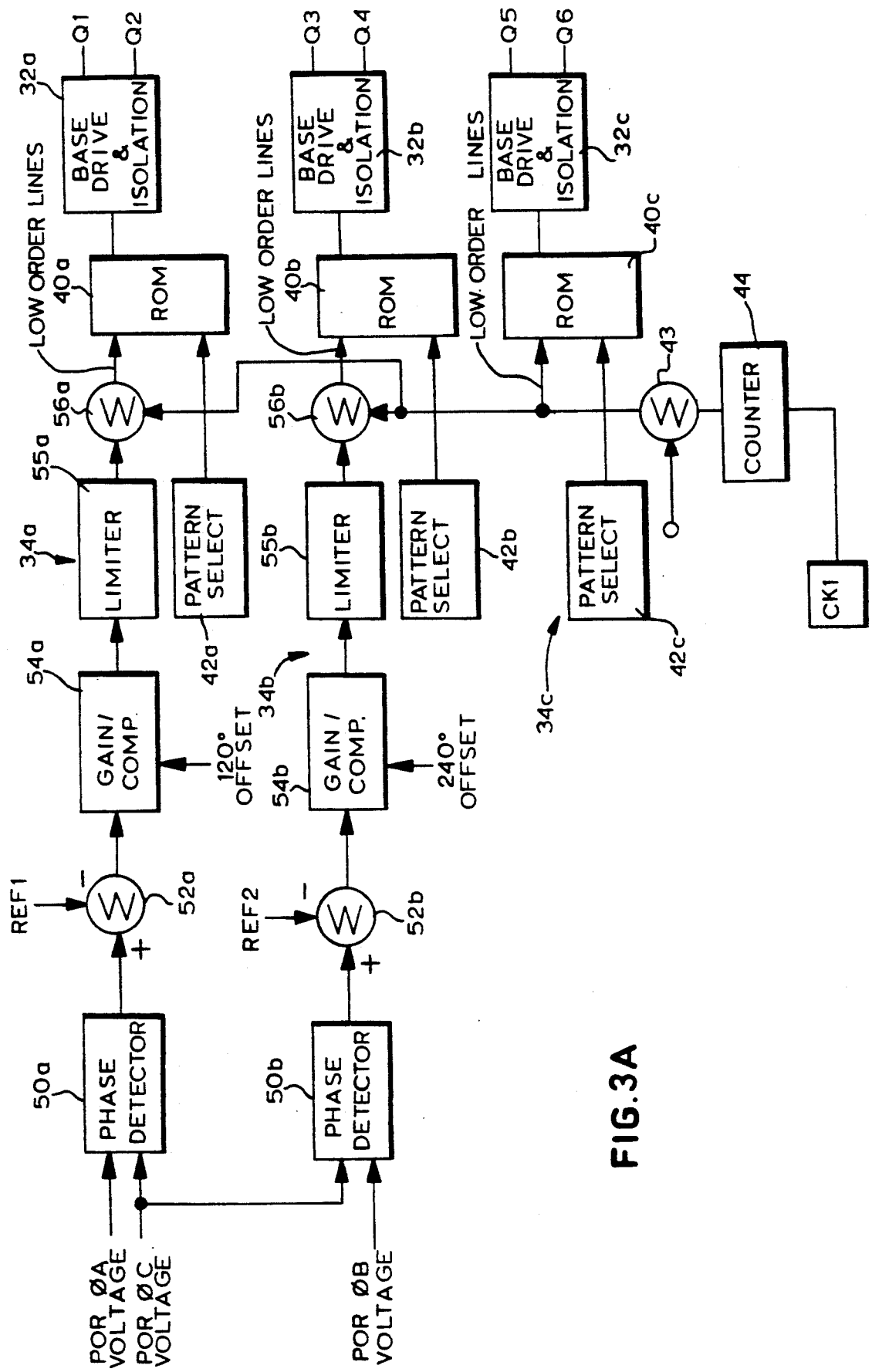
FIGS. 3a and 3b show a control arrangement for controlling the first and second inverters shown in FIG. 2.

First inverter 11 is controlled by the system shown in FIG. 3A. This system includes three control signal generators 34a-34c, each of which is responsible to a corresponding one of the phase voltages developed at the point of reference (POR).

Each inverter control signal generator 34a-34c includes corresponding memories 40a-40c which preferably store a plurality of pulse width modulated (PWM) waveforms which are retrieved and provided as the control signals to the base drive and isolation circuits 32a-32c. These base drive and isolation circuits provide inverter control signals to the transistors Q1-Q6 of first inverter 11 as shown. Each memory 40a-40c may be of the read-only memory (ROM) type or may be any other type as desired. Each PWM waveform is obtained by sequentially addressing successive memory locations in the memory 40a-40c under control of addressing signals provided by pattern selection circuits 42a-42c. The frequency at which the particular memory locations are addressed is controlled by clock CK1. Low order address lines of the memory 40c (the memory for the reference phase) receive a digital value produced by counter 44. Thus, the fundamental output frequency of the power produced at the phase C output is controlled by the output frequency of counter 44. The output frequency of the remaining phases A and B are likewise controlled by the frequency of counter 44 as noted in greater detail below.

The POR phase voltages are detected and applied to phase A and phase B detectors 50a and 50b which develop outputs representing the phase displacement between the POR phase A and phase C voltages and the POR phase B and phase C voltages. The signal from phase detector 50a is summed with a reference signal REF1 by summer 52a. The signal REF1 represents the desired phase displacement between phases A and C. Likewise, a signal from phase detector 50b is summed by summer 52b with a reference signal REF2 which represents the desired phase displacement between phases B and C. The resulting deviation signals from summer 52a and 52b represent the deviation of phase A and phase B voltages relative to their desired displacements with respect to the phase C voltage and are processed by optional gain and compensation units 54a and 54b and limiters 55a and 55b and are applied to digital summers 56a and 56b, respectively.

The outputs of the limiters 55a and 55b and the output of counter 44 are digital values which are applied to digital summers 56a and 56b. It is by means of these summers 56a and 56b that the low-order addresses of memories 40a and 40b can be advanced or retarded with respect to the low-order addresses of memory 40c (i.e., the reference phase) to achieve phase separation control. The outputs of the summers 56a and 56b are such that the waveforms developed at the output of memories 40a and 40b lead the waveform developed by the output of memory 40c by 240° and 120°, respectively.

The output from counter 44 is connected to summers 56a and 56b and to memory 40c through summer 43. Summer 43 also receives an input from a reference which establishes a phase reference for each of the phases controlled by control signal generators 34a, 34b, and 34c. In this case, the reference is zero. As the foregoing discussion demonstrates, the values provided by gain and compensation blocks 54a and 54b are correction values which advance or retard the addressing of memory locations in memories 40a and 40b as necessary to maintain precise 120° phase displacement in the phase outputs.

Instead of a single summer 43, three such summers could be used. In this embodiment, the output of counter 44 would be directly connected to summers 43, 56a and 56b instead of to summers 56a and 56b through summer 43. A first summer would be added having one input from the output of summer 56a, a second input from the phase reference $\phi$, and an output to the low order lines of ROM 40a. A second summer would be added having one input from the output of summer 56b, a second input from the phase reference $\phi$, and an output to the low order lines of ROM 40b. Summer 43 would be as shown except that its output would be connected to only the low order lines of ROM 40c and not also to summers 56a and 56b.

Figure 3B:
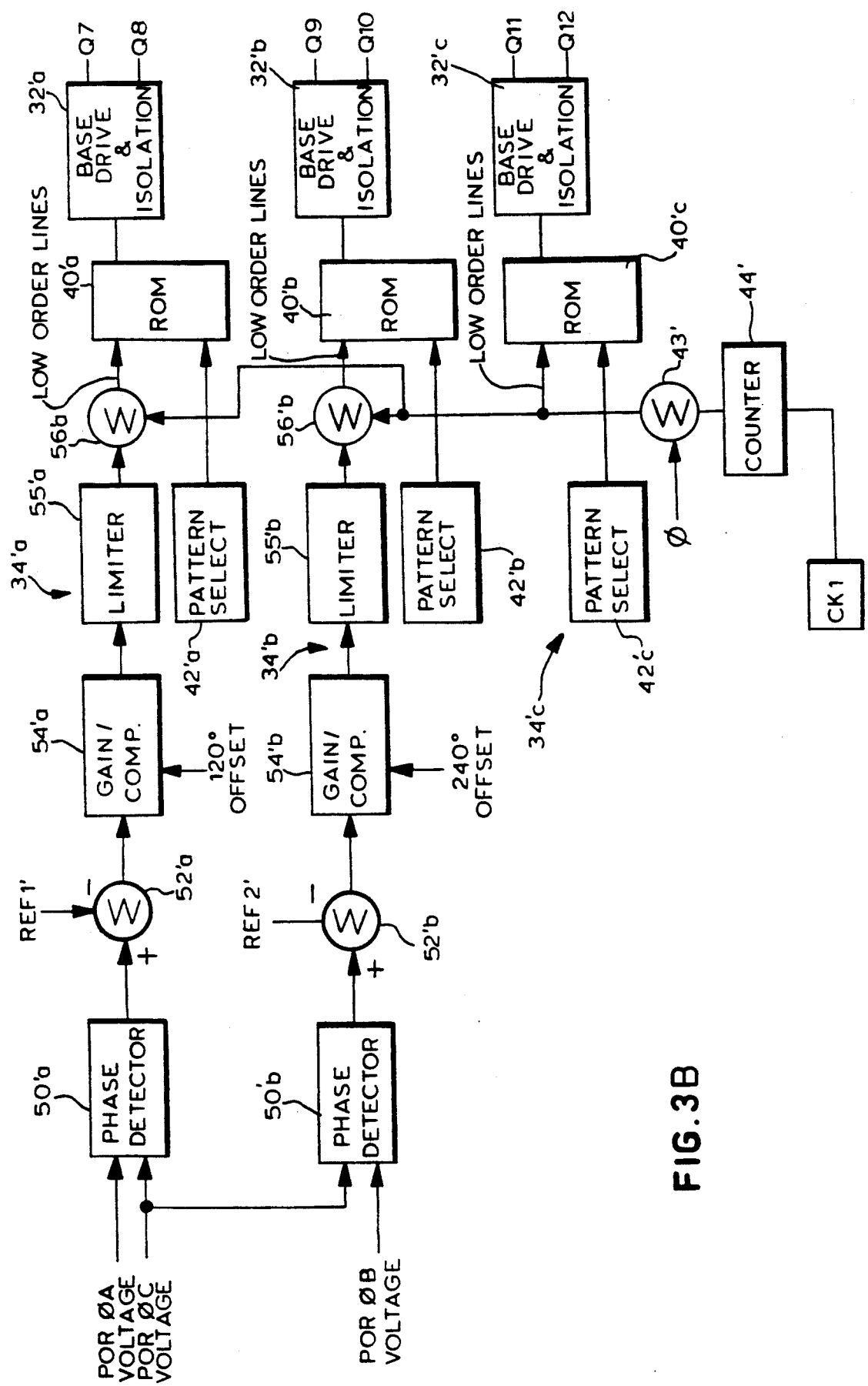

Second inverter 13 is controlled by the inverter controller shown in FIG. 3B. This inverter controller can be substantially the same as that shown in FIG. 3a. In fact, prime numbers are shown in FIG. 3b to indicate the corresponding structures of FIG. 3a. Pattern selection by pattern selectors 42a, 42b, and 42c in FIG. 3A for first inverter 11 can be made in order to minimize DC and harmonic content, and to control voltage amplitude, at the POR as is shown in our copending application Ser. No. 07/745,425, filed on Aug. 15, 1991. Similarly, pattern selectors 42'a, 42'b, and 42'c can select patterns for second inverter 13 to minimize DC and harmonic content, and to control voltage amplitude, in the second inverter output with respect to the first inverter output, again as shown in copending application Ser. No. 07/745,425, filed on Aug. 15, 1991. (DC content correction need not be accomplished by the pattern selectors but may be introduced between ROMs 40 and base drive and isolation circuits 42 for the inverters, as disclosed in U.S. Pat. No. 4,882,120). The difference between the reference value for summer 43' in FIG. 3B and the reference value for summer 43 shown in FIG. 3A results in a phase separation $\phi$ between the output from second inverter 13 and the output from first inverter 11 of a predetermined number of degrees. This predetermined number of degrees can be selected empirically in order to further reduce the undesirable harmonics at the POR. This difference in phase between corresponding phases of the first and second inverter outputs results in suppression of harmonics by selecting this phase difference to be 180° at a selected harmonic such as the 23rd harmonic. Higher frequency harmonics will also be attenuated to some extent. Lower frequency harmonics can be eliminated or attenuated by pattern selectors 42 as discussed above and also by filter 24. Thus, by establishing a difference between the references to summers 43' and 43¹, the addressing of specific PWM waveforms from memories 40'a-40'c will be offset from the addressing of specific PWM waveforms from memories 40a-40c in order to drive transistors Q7-Q12 in a way that provides a phase difference between the second inverter output and the first inverter output. The controller shown in FIG. 3B could be modified to use three summers in place of the one summer 43' as discussed above in relation to FIG. 3A.

Figure 4:
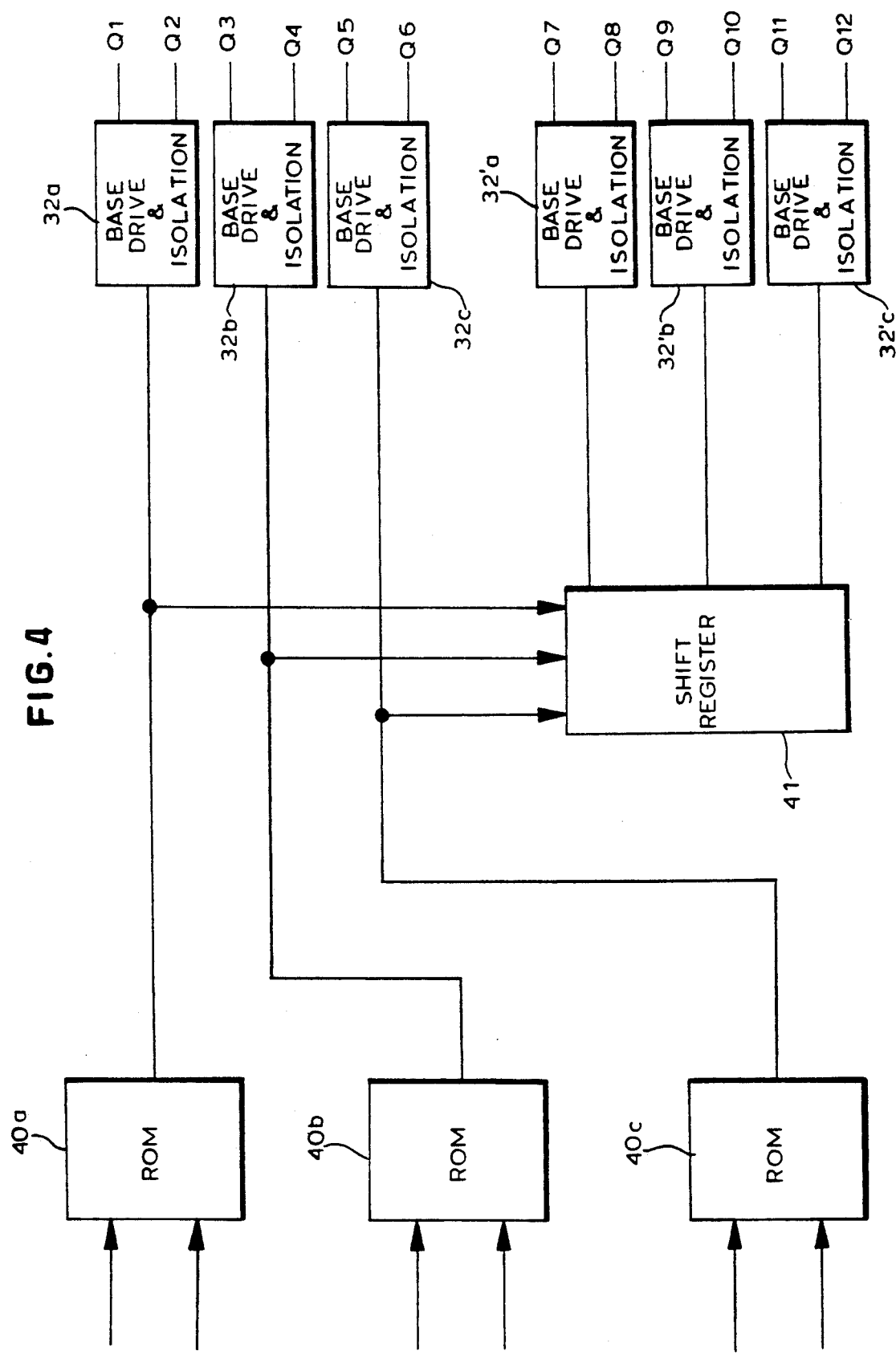
FIG. 4 shows an alternative embodiment of the invention.

FIG. 4 shows an alternative embodiment for providing a phase offset between the second inverter output and the first inverter output. In this case, the outputs from ROMs 40a-40c, which are connected through respective base drive and isolation circuits 32a-32c, are also connected to shift register 41. Shift register 41 introduces a delay between base drive and isolation circuits 32a-32c and corresponding base drive and isolation circuits 32'a-32'c. Thus, transistors Q7-Q12 will be operated under the same PWM patterns as transistors Q1-Q6, but delayed by a predetermined number of phase degrees therefrom. Again, the predetermined number of degrees can be selected for eliminating additional undesired harmonics. In the arrangement of FIG. 4, it may be desirable to interpose additional DC content correction circuitry between the shift register 41 and base drive and isolation circuits 32'a-32'c in a manner similar to that shown in U.S. Pat. No. 4,882,120. Also, if desired, additional first inverter DC content correction circuitry can be also introduced between ROMs 40a-40b and base drive and isolation circuits 42a-42c. Master and second controller pulse protection circuitry can also be added if necessary.

In FIG. 5, there is shown a modification to one of the controls of FIGS. 3a and 3b in order to implement an alternative embodiment of the present invention, it being understood that the other control could be similarly modified. The embodiment of FIG. 5 is an open-loop control which relies upon prior knowledge of phase shifts as a function of load so that phase errors can be accurately corrected.

Phase detectors 50a, 50b and summers 52a, 52b of FIG. 3a or FIG. 3b are replaced by phase A, phase B, and phase C sensors 68a, 68b, and 68c, summers 70a and 70b and look-up tables 72a and 72b. Sensors 68a-68c sense one or more parameters of the power at the POR, e.g., total power, real and/or reactive power, current, power factor, etc. The output of the phase C sensor is subtracted from the outputs of the phase A and phase B sensors by summers 70a and 70b. The resulting signals represent the difference in the power parameter(s) provided to the POR by the phase A and phase C outputs, and the difference in the power parameter(s) at the phase B and phase C outputs. These signals are provided to look-up table 72a and 72b which store a series of values representing the desired phase displacement between phases A and C and phases B and C for each of a plurality of phase parameter differences. Look-up table outputs are coupled to the optional gain and compensation circuits 54a and 54b and then to digital summers 56a and 56b, and the balance of the circuitry shown in FIGS. 3a and 3b.

As was noted in connection with FIGS. 3a and 3b, the control of the FIG. 5 embodiment is capable of accurately controlling phase separation, provided that prior knowledge of phase shifts with load are accurately known in advance.

FIG. 5 could be modified by adding a first summer having an input from the output of summer 56a, a second summer having an input from the output of summer 56b, and a third summer having an input from the output of the counter. Each of the three additional summers would have a reference phase $\phi$ as a second input and an output to a corresponding ROM 40a-40c.

What is claimed is:

1. A system for receiving DC input and for providing AC output, said AC output having first and second AC output phases, said system comprising:

first inverter means for inverting DC input into a first inverter AC output, said first inverter AC output having at least first and second phases;

second inverter means for inverting DC input into a second inverter AC output, said second inverter AC output having at least first and second phases;

inverter control means connected to said first and second inverter means for controlling said first inverter means such that said first and second phases of said first inverter means are separated by a first number of degrees and for controlling said second inverter means such that said first and second phases of said second inverter means are separated by a second number of degrees and such that said first and second phases of said second inverter means are separated from said first and second phases of said first inverter means respectively by a third number of degrees selected to suppress harmonics in said AC output;

first-phase combining means connected to said first inverter means and to said second inverter means for combining said first phases of said first and second inverter means into said first AC output phase; and, second-phase conbining means connected to said first inverter means and to said second inverter means for combining said second phases of said first and second inverter means into said second AC output phase.

2. The system of claim 1 wherein said first and second combining means comprise respective first and second windings having respective first and second taps and each having first and second ends wherein said first end of said first winding is connected to said first inverter means for receiving said first phase of said first inverter AC output, wherein said second end of said first winding is connected to said second inverter means for receiving said first phase of said second inverter AC output, wherein said tap of said first winding provides said first AC output phase, wherein said first end of said second winding is connected to said first inverter means for receiving said second phase of said first inverter AC output, wherein said second end of said second winding is connected to said second inverter means for receiving said second phase of said second inverter AC output, and wherein said tap of said second winding provides said second AC output phase.

3. The system of claim 1 wherein said inverter control means comprises first pattern selection means for selecting a pattern for said first inverter AC output.

4. The system of claim 3 wherein said inverter control means comprises clock means having an output connected to one input of a first comparison means, said first comparison means having a second input for receiving a first reference signal, and an output connected to said first pattern selection means.

5. The system of claim 4 wherein said inverter control means comprises second pattern selection means for selecting a pattern for said second inverter AC output.

6. The system of claim 5 wherein said inverter control means comprises a second comparison means having a first input connected to said clock means, a second input for receiving a second reference signal, and an output connected to said second pattern selection means, said first and second references having a difference sufficient to establish said third number of degrees.

7. The system of claim 6 wherein said first and second combining means comprise respective first and second windings having respective first and second taps and each having first and second ends wherein said first end of said first winding is connected to said first inverter means for receiving said first phase of said first inverter AC output, wherein said second end of said first winding is connected to said second inverter means for receiving said first phase of said second inverter AC output, wherein said tap of said first winding provides said first AC output phase, wherein said first end of said second winding is connected to said first inverter means for receiving said second phase of said first inverter AC output, wherein said second end of said second winding is connected to said second inverter means for receiving said second phase of said second inverter AC output, and wherein said tap of said second winding provides said second AC output phase.

8. The system of claim 3 wherein said inverter control means comprises delay means for controlling said second inverter means such that said first and second phases of said second inverter AC output are delayed by said third number of degrees from said first and second phases of said first inverter AC output.

9. The system of claim 8 wherein said first and second combining means comprise respective first and second windings having respective first and second taps and each having first and second ends wherein said first end of said first winding is connected to said first inverter means for receiving said first phase of said first inverter AC output, wherein said second end of said first winding is connected to said second inverter means for receiving said first phase of said second inverter AC output, wherein said tap of said first winding provides said first AC output phase, wherein said first end of said second winding is connected to said first inverter means for receiving said second phase of said first inverter AC output, wherein said second end of said second winding is connected to said second inverter means for receiving said second phase of said second inverter AC output, and wherein said tap of said second winding provides said second AC output phase.

10. The system of claim 1 wherein said inverter control means comprises delay means for controlling said second inverter means such that said first and second phases of said second inverter AC output are delayed respectively by said third number of degrees from said first and second phases of said first inverter AC output.

11. A method for producing AC power from a DC input, said AC power having at least first and second AC output phases, said method comprising the following steps:

controlling a first inverter for inverting a DC input to provide a first inverter output having at least first and second phases;

controlling a second inverter for inverting a DC input to produce a second inverter output having at least first and second phases such that said first and second phases of said second inverter output are separated from said first and second inverters phases of said first inverter output by a number of degrees selected to suppress harmonics in said AC output;

combining said first phases of said first and second inverter outputs to produce said first AC output phase; and, combining said second phases of said first and second inverter outputs to produce said second AC output phase.

12. The method of claim 11 wherein said combining steps comprise the steps of supplying said first phases of said first and second inverters to respective ends of a first winding having a tap for providing the first AC output phase and of supplying said second phase of said first and second inverter to respective ends of a second winding having a tap for providing the second AC output phase.

13. The method of claim 12 wherein said step of controlling said first inverter comprises the steps of selecting a first inverter pattern and controlling said first inverter according to said first inverter pattern.

14. The method of claim 13 wherein said step of selecting said first inverter pattern comprises the step of comparing a clock signal to a first reference in order to assist in the pattern selection.

15. The method of claim 14 wherein said step of controlling said second inverter control comprises the steps of selecting a second inverter pattern and controlling said second inverter according to said second inverter pattern.

16. The method of claim 15 wherein said step of selecting said second inverter pattern comprises the further step of comparing said clock signal to a second reference in order to assist in selecting said second inverter pattern, said first and second references having a difference representing said number of degrees.

17. The method of claim 13 wherein said step of controlling said second inverter comprises the step of delaying said second inverter output from said first inverter output by said number of degrees.

18. The method of claim 11 wherein said step of controlling said second inverter comprises the step of delaying said second inverter output from said first inverter output by said number of degrees.

* * * * *